(12) United States Patent
Czechtizky

(10) Patent No.: US 11,970,897 B2
(45) Date of Patent: Apr. 30, 2024

(54) ENGINE HOOD DRIVE FOR AN ENGINE HOOD SYSTEM OF A MOTOR VEHICLE

(71) Applicant: Dr. Ing. h.c. F. Porsche Aktiengesellschaft, Stuttgart (DE)

(72) Inventor: Timo Czechtizky, Zell unter Aichelberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 357 days.

(21) Appl. No.: 17/511,736

(22) Filed: Oct. 27, 2021

(65) Prior Publication Data
US 2022/0136312 A1 May 5, 2022

(30) Foreign Application Priority Data
Nov. 3, 2020 (DE) .......................... 102020128865.4

(51) Int. Cl.
*E05F 15/63* (2015.01)
*B62D 25/12* (2006.01)
*E05B 83/24* (2014.01)

(52) U.S. Cl.
CPC .............. *E05F 15/63* (2015.01); *B62D 25/12* (2013.01); *E05B 83/24* (2013.01);
(Continued)

(58) Field of Classification Search
CPC ........... E05Y 2800/296; E05Y 2600/32; E05Y 2201/434; E05Y 2201/626;
(Continued)

(56) References Cited

U.S. PATENT DOCUMENTS 5,263,546 A * 11/1993 Cady ....................... B60R 19/00
16/337
5,385,212 A * 1/1995 Cady ....................... B60R 19/00
180/274
(Continued)

FOREIGN PATENT DOCUMENTS

CA  2 518 682 A1  3/2007
DE  4141820 A1  6/1993
(Continued)

OTHER PUBLICATIONS

Office Action (First Office Action) issued Dec. 26, 2023, by the State Intellectual Property Office of People's Republic of China in corresponding Chinese Patent Application No. 202111293108.0 and an English translation of the Office Action. (12 pages).

*Primary Examiner* — Paul N Dickson
*Assistant Examiner* — Timothy Wilhelm
(74) *Attorney, Agent, or Firm* — Buchanan Ingersoll & Rooney PC

(57) ABSTRACT

An engine hood drive for an engine hood system of a motor vehicle includes a drive unit for delivering a torque at a predetermined adjusting angle between a passive position and an active position. A drive lever is connected in a torque-transmitting manner to the drive unit for pivoting between the passive position and the active position and which has an actuating end. A driving slot has a guide receiver for the actuating end of the drive lever. The driving slot is pivotable about a flap hinge for an engine hood at a predetermined flap angle between a closed position and an open position. The driving slot is transferrable in the direction of the open position as a result of a pivoting movement of the drive lever from the direction of the passive position in the direction of the active position.

10 Claims, 2 Drawing Sheets

(52) U.S. Cl.
CPC ... *E05Y 2201/434* (2013.01); *E05Y 2201/626* (2013.01); *E05Y 2900/536* (2013.01)

(58) Field of Classification Search
CPC ......... E05Y 2900/536; E05Y 2201/424; E05Y 2800/40; E05F 15/63; E05F 15/00; E05F 15/53; E05F 15/611; B62D 25/12; B62D 25/105; B60R 21/34; E05B 83/24
See application file for complete search history.

(56) References Cited

U.S. PATENT DOCUMENTS

| | | | | |
|---|---|---|---|---|
| 6,167,977 B1 * | 1/2001 | Adamson | ............... | B62D 25/10 |
| | | | | 16/361 |
| 6,439,330 B1 * | 8/2002 | Paye | ....................... | E05D 3/022 |
| | | | | 180/274 |
| 6,953,220 B2 * | 10/2005 | Takehara | ............ | B62D 25/105 |
| | | | | 296/193.11 |
| 7,077,225 B2 * | 7/2006 | Minami | ................. | E05D 11/00 |
| | | | | 180/69.21 |
| 7,303,040 B2 * | 12/2007 | Green | ..................... | B62D 25/12 |
| | | | | 180/274 |
| 7,374,008 B1 * | 5/2008 | Neal | ....................... | B60R 21/38 |
| | | | | 180/274 |
| 7,594,555 B2 * | 9/2009 | Lutter | .................... | B60R 21/38 |
| | | | | 180/274 |
| 7,730,990 B2 * | 6/2010 | Boggess | ............... | B62D 25/12 |
| | | | | 180/274 |
| 7,861,818 B2 * | 1/2011 | Boggess | ............... | B62D 25/12 |
| | | | | 180/274 |
| 8,230,960 B2 * | 7/2012 | Shoen | .................... | E05C 17/14 |
| | | | | 296/193.11 |
| 8,534,410 B2 * | 9/2013 | Nakaura | ................ | E05B 77/08 |
| | | | | 180/274 |
| 10,100,565 B2 * | 10/2018 | Waskie | .................... | E05D 15/48 |
| 10,124,878 B2 * | 11/2018 | Buttelmann | ........... | E05F 15/53 |
| 11,199,032 B2 * | 12/2021 | Menke | ............ | E05B 63/244 |
| 11,268,297 B2 * | 3/2022 | Nottebaum | ........... | E05B 83/24 |
| 11,473,346 B2 * | 10/2022 | Nottebaum | ............. | E05B 81/14 |
| 11,697,952 B2 * | 7/2023 | Ottino | .................... | E05F 1/105 |
| | | | | 49/139 |

FOREIGN PATENT DOCUMENTS

| | | | | |
|---|---|---|---|---|
| DE | 4240790 C1 * | 2/1994 | .............. | E05D 3/06 |
| DE | 4240790 C1 | 2/1994 | | |
| DE | 101 52 621 A1 | 5/2003 | | |
| DE | 10 2005 007 903 A1 | 11/2005 | | |
| DE | 10 2005 034 099 A1 | 2/2007 | | |
| DE | 103 62 118 B4 | 1/2015 | | |

\* cited by examiner

US 11,970,897 B2

ENGINE HOOD DRIVE FOR AN ENGINE HOOD SYSTEM OF A MOTOR VEHICLE

CROSS-REFERENCE TO RELATED APPLICATION

This application claims priority to German Patent Application No. 10 2020 128 865.4, filed Nov. 3, 2020, the content of such application being incorporated by reference herein in its entirety.

FIELD OF THE INVENTION

The invention relates to an engine hood drive for an engine hood system of a motor vehicle, an engine hood system having such an engine hood drive for a motor vehicle, as well as a motor vehicle having such an engine hood system.

BACKGROUND OF THE INVENTION

Engine hoods are known in motor vehicles as a component of the chassis, wherein a front compartment is closed and concealed in an accessible manner (generally as far as possible in a streamlined manner) by an engine hood. A driving engine or a luggage compartment of the motor vehicle is located in such a front compartment. Hitherto such engine hoods were exclusively opened by hand. This is increasingly perceived as a drawback on the part of the consumer. Nevertheless quite different requirements are set for an engine hood than for a tailgate. A system of a tailgate is thus not applicable to an engine hood.

SUMMARY OF THE INVENTION

Proceeding from the background described above, it would be desirable to at least partially overcome the drawbacks known from the prior art.

The invention relates to an engine hood drive for an engine hood system of a motor vehicle comprising at least the following components:
- a drive unit for delivering a torque at a predetermined adjusting angle between a passive position and an active position;
- a drive lever which is connected in a torque-transmitting manner to the drive unit for pivoting between the passive position and the active position and which has an actuating end;
- a driving slot with a guide receiver for the actuating end of the drive lever, wherein the driving slot is pivotable about a flap hinge for an engine hood at a predetermined flap angle between a closed position and an open position, wherein the driving slot is transferrable in the direction of the open position as a result of a pivoting movement of the drive lever from the direction of the passive position in the direction of the active position.

The engine hood drive is primarily characterized in that in the closed position the driving slot is decoupled from the drive lever.

If the axial direction, radial direction or the peripheral direction and corresponding terms are used unless explicitly indicated otherwise, reference is made hereinafter to the aforementioned rotational axis. Ordinal numbers used in the description above and below, provided it is not explicitly indicated to the contrary, merely serve to enable a clear differentiation and do not represent any sequence or order of priority of the denoted components. An ordinal number greater than one does not require that another such component has to necessarily be present.

The engine hood drive proposed herein is configured for an engine hood of an engine hood system for a motor vehicle, wherein the engine hood, for example, is of conventional design and/or designed to be individually variable according to an aesthetic and mechanical design. A driving slot is able to be connected to such an engine hood, for example fixedly secured to the engine hood. Alternatively, the driving slot is a component of a hinge and/or is displaceably connected to the engine hood by means of a rail connection. The driving slot cooperates with an actuating end of the drive lever, wherein for opening the engine hood the actuating end is in contact with the guide receiver. The drive lever itself is driven by a drive unit, for example directly by a rotor shaft of an electrical driving engine or via a gear mechanism, for example comprising a spindle drive. The drive lever is thus pivotable in an automated manner, for example electrically or hydraulically, between a passive position and an active position, preferably about a rigid drive pivot axis, for example the rotational axis of a rotor and/or a spindle. In the active position of the drive lever, the driving slot is forced into an open position. With the drive lever in the passive position it is possible for the driving slot to adopt a closed position, i.e. when used in an engine hood system the engine hood is closed.

The engine hood drive proposed herein is thus designed such that in the closed position of the driving slot, i.e. the closed position of the engine hood, the drive lever is decoupled from the driving slot. In this case the driving slot is decoupled such that the driving slot is pivotable independently of the drive lever between the closed position and the open position. Thus it is ensured that an emergency opening of the engine hood is also possible when the drive lever is blocked, for example due to a locking and a malfunction of the drive unit. For a particularly advantageous embodiment, a movement of the driving slot and/or the engine hood is also possible independently of the drive lever in order to permit a negative pivoting movement of the engine hood for the impact protection of pedestrians. A movement of the engine hood upwardly is also possible. This is required in the case of active hinge systems when the engine hood is lifted upwardly for the protection of the pedestrian.

In one advantageous embodiment, the driving slot is designed with an engine hood-side contact path and (preferably the contact path is designed on the one hand to be closed and on the other hand) on the opposing side, i.e. on the drive lever side, to be open. By means of this opening the actuating end of the drive lever is able to be separated from a contact with the contact path of the driving slot. This opening is arranged such that, in the case of a transition from a contact with the contact path of the guide receiver toward the passive position of the drive lever, the drive lever is able to be guided away from the contact path of the guide receiver and/or in this position of the drive lever the driving slot is pivotable out of the closed position into the open position independently of the drive lever. In this state, at the same time the engine hood is preferably movable with a negative pivoting movement independently of the drive lever, for the active impact protection of pedestrians.

In an advantageous embodiment of the engine hood drive it is also proposed that as a result of a transfer of the driving slot into the open position by means of the drive lever, the driving slot and the drive lever are fixedly coupled together.

In this embodiment it is proposed that, when opening the engine hood by means of the drive lever, the driving slot and the drive lever and thus the engine hood and the drive lever are fixedly coupled together. In the open position, therefore, the driving slot and/or the engine hood is not movable independently of the drive lever. In an advantageous embodiment, the driving slot and/or the engine hood is able to be held in the open position solely by the drive lever and/or the drive unit, and namely at least counter to a closing moment which is designed to be at a maximum and which is applied to the point (the tip) of the engine hood spaced furthest apart from the pivot axis of the engine hood. For example, the drive lever is locked in this active position, which corresponds to the open position of the driving slot and/or the engine hood, for example, by means of a brake or by means of a self-locking spindle thread or is secured in this active position by means of an active engine torque of an electrical driving engine and/or by means of an applied pressure of a hydraulic system. In an advantageous embodiment, a drive lever-side coupling path, which opposes the contact path, adjoins the opening of the guide receiver, as described above by way of example, so that the actuating end of the drive lever is arranged between the contact path and the coupling path, at least when the drive lever is in the active position and the driving slot is in the open position and when the driving slot has been transferred by means of the drive lever into the open position. In one embodiment it is possible to transfer the engine hood and thus the driving slot by hand into the open position and then to transfer the drive lever into the active position, wherein the driving slot and the drive lever are then not fixedly coupled together but a movement of the driving slot is transferrable into the closed position only counter to a torque from the drive lever. In an alternative embodiment, when transferring the driving slot into the open position by hand, a transfer of the drive lever from the passive position is mechanically and/or electrically excluded.

In an advantageous embodiment of the engine hood drive it is also proposed that on the closed position side, on the other side of a predetermined balanced position of the driving slot and before the closed position, the driving slot is decoupled from the drive lever.

In this embodiment a protection against trapping, for example of fingers when handling the engine hood, at least by means of the drive unit, is excluded. For transferring the driving slot and/or the engine hood into the closed position, the engine hood either has to be transferred by hand into the closed position or a so-called closing aid is provided. The closing aid is designed such that below the predetermined balanced position in which the drive lever decouples, the driving slot (indirectly or directly) and/or the engine hood is able to be acted upon by the closing aid. In the acted-upon state, the engine hood is then actively transferrable, for example by motor, into the closed position by means of the closing aid. In an advantageous embodiment, the engine hood is then secured in the closed position by the closing aid itself (preferably without receiving external energy). The drive lever is then already decoupled and, for example, transferred into its passive position such that even in the closed position the drive lever is no longer in contact with the contact path of the guide receiver and/or is only in contact without force. For this task the driving slot is preferably open on the drive lever side, i.e. for example designed with the opening of the guide receiver, as described above, wherein the drive lever and/or the actuating end in the described position of the driving slot may be already decoupled (on the closed position side on the other side of the predetermined balanced position). The predetermined (unstable) balanced position of the driving slot and/or the engine hood is that pivot position in which under the influence of the Earth's gravitational field the engine hood automatically moves neither into the closed position nor into the open position.

In an advantageous embodiment of the engine hood drive it is also proposed that toward the passive position and on the other side of the closed position of the driving slot the predetermined adjusting angle of the drive lever comprises a free travel.

In this embodiment it is proposed that the adjusting angle of the drive lever comprises a free travel which is directly adjacent to the passive position in the direction of the active position. Here it is achieved that the driving slot is transferrable into the closed position, and is able to be held in the closed position, in a manner free from a force originating from the drive lever. Thus when securing the driving slot and/or the engine hood in the closed position, with a corresponding configuration of the free travel of the drive lever it does not lead to tension and/or deformation of the engine hood due to tolerances and/or variable thermal expansion of the drive lever.

According to a further aspect, an engine hood system for a motor vehicle is proposed, comprising at least the following components:
- an engine hood for the accessible closure of a front compartment of a motor vehicle;
- a flap hinge to which the engine hood is connected so as to be pivotable between a closed position and an open position at the predetermined flap angle; and
- an engine hood drive according to an embodiment according to the above description, wherein the driving slot is connected in a force-transmitting manner to the engine hood, wherein the engine hood is pivotable by means of the drive unit between the closed position and the open position.

An engine hood system is now proposed herein which comprises an engine hood which is suspended on a flap hinge and which is movable by means of an engine hood drive, as described above, and/or is also movable by hand out of the closed position into the open position (for example for emergency opening) and preferably is additionally designed for a negative pivoting movement for an active impact protection of pedestrians. In a preferred embodiment, the engine hood is rigidly connected to the driving slot so that the actuating end of the drive lever describes a relative movement to the driving slot and/or the guide receiver thereof, corresponding to the movement of the engine hood, when the engine hood is pivoted by the drive unit out of the closed position into the open position. It should be mentioned here that the flap hinge does not necessarily have a rigid hinge axis but instead preferably has a pivoting arm so that the engine hood is movable as closely as possible to adjacent components, for example a windshield of a motor vehicle, without colliding.

In an advantageous embodiment of the engine hood system it is also proposed that a receiving frame is also encompassed, wherein the engine hood in the closed position bears against the receiving frame so as to close the front compartment, wherein a lock is also provided between the receiving frame and the engine hood for securing the engine hood in the closed position, wherein the lock preferably comprises a closing aid which is movable between a released position and a closed position, wherein the closing aid is in contact with the engine hood with the transition of the drive lever into the free travel to such an extent with the engine hood that the engine hood is held open by the closing aid in the released position.

In this case a lock and a receiving frame are provided, wherein the receiving frame is fixedly connected, for example, to a chassis of a motor vehicle and/or integrally formed with parts or a part of the chassis. The lock comprises, for example, an eye and a bolt and/or a hook system, the engine hood being able to be secured sufficiently securely thereby to the receiving frame in the closed position. The lock is closed in the closed position in which the engine hood is secured, preferably without receiving external energy, for example by means of a tension spring. The eye of the lock and/or the passive component of the lock is preferably fastened to the engine hood. In a preferred embodiment, the lock and/or the component fastened to the engine hood is arranged at the tip of the engine hood. For an emergency opening of the engine hood, the lock is preferably openable by hand. In one embodiment, for example, the lock is unlockable electrically and/or mechanically by means of a lever from the driver's cab of the motor vehicle.

In an advantageous embodiment, the lock comprises a closing aid, the engine hood being transferrable thereby from a position virtually in the closed position into the closed position, wherein the closed position then corresponds to the locked position of the closing aid and the position of the engine hood virtually in the closed position corresponds to the released position of the closing aid. The path of the closing aid between the released position and the locked position corresponds, for example, to one or more centimeters (1 cm or more) so that with the closing aid in the released position an injury-causing trapping of a human hand is excluded. In an advantageous embodiment, when the drive lever is decoupled, the closing aid only acts to a small extent in the released position such that from this position the engine hood is able to be released out of the closing aid and moved toward the open position by hand with little resistance, at least with such a small resistance that an injurious trapping of a human hand is prevented. Thus a jamming and/or damaging of the engine hood system is excluded. In one embodiment, the locked position is able to be adopted by the closing aid only when the lock is already acting such that the engine hood is able to be entrained by the closing aid, for example the lock is already fully closed. In one embodiment, the closing aid is simply a ramp device of the lock, wherein for example the lock is automatically transferred by this ramp into a position acting on the engine hood, when the engine hood is virtually in the closed position, and is preferably decoupled from the drive lever. Thus the engine hood, with the transition of the drive lever into the free travel, is in contact with the engine hood and the engine hood is held open in a suitable manner to a minimal extent by means of the closing aid.

In an advantageous embodiment of the engine hood system it is also proposed that with the engine hood in the closed position a negative pivoting movement of the engine hood is possible by means of the flap hinge of the engine hood for the active impact protection of pedestrians.

It is now proposed here that the engine hood and/or the flap hinge is designed for a negative pivoting movement of the engine hood for the active impact protection of pedestrians, i.e. for so-called active hinge systems. In one embodiment, the flap hinge is designed passively or actively therefor, wherein preferably a pyrotechnical system is provided to perform the desired negative pivoting movement of the engine hood. In an advantageous embodiment, in the case of this negative pivoting movement, according to one embodiment according to the above description the lock is designed as a negative pivot axis for the engine hood, wherein preferably the lock is then arranged at the tip of the engine hood, i.e. with a large spacing (for example which is as large as possible) from the flap hinge.

In an advantageous embodiment of the engine hood system it is also proposed that the engine hood is able to be held in the open position by means of the drive lever in cooperation with the driving slot, wherein preferably a corresponding closing moment which is designed to be at a maximum is able to be received from the drive unit.

As already described above in connection with the engine hood drive, it is now proposed here that the engine hood is able to be held in the open position by means of the drive lever. To this end, the drive lever and/or the drive unit is (passively) lockable, for example by means of a brake or a self-locking spindle thread. Alternatively, by means of a force and/or torque delivered by an electrical driving engine and/or by a pressure source in the active position the drive lever is (actively) designed to hold the driving slot and/or the engine hood in the open position. The opposing moment is a maximum closing moment according to the design, which acts from a force in the direction of the locked position at the point of the engine hood (tip) furthest removed from the flap hinge of the engine hood. The force is, for example, slightly greater, for example two times greater, than that caused by the Earth's gravitational field. Thus a securing is provided against the engine hood snapping shut.

According to a further aspect, a motor vehicle is proposed, comprising a chassis frame, a front compartment, an engine hood system according to an embodiment according to the above description and a chassis, wherein the chassis comprises the engine hood of the engine hood system, wherein the front compartment is preferably configured as a luggage compartment.

A motor vehicle is now described herein which a chassis frame and a chassis are provided, wherein a front compartment is formed by the chassis or between the chassis frame and the chassis, said front compartment being closable in an accessible manner by an engine hood. An engine hood drive is provided for opening and closing the engine hood as described above. In an advantageous embodiment, the front compartment is configured as a luggage compartment, for example in a motor vehicle with rear wheel drive and/or with electrical drive, for example with at least in some cases a wheel hub motor. In an alternative embodiment, the front compartment is configured as an engine compartment, for example for an internal combustion engine or a hybrid system with at least an electrical driving engine and an internal combustion engine, for example for front axle drive and/or rear axle drive (via a cardan shaft).

A convenient opening of the engine hood is able to be fulfilled by means of the engine hood system proposed here, and at the same time all of the requirements for such an engine hood are able to be fulfilled, wherein at the same time the effort for the corresponding drive and/or the lever gear mechanism is low and thus the costs are small.

It is noted that the features of the claims may be combined in any technically expedient manner, wherein the explanations from the following description as well as features from the figures which comprise supplementary embodiments of the invention may also be consulted to this end.

BRIEF DESCRIPTION OF THE DRAWINGS

The above-described invention is described in detail hereinafter against the relevant technical background with reference to the accompanying drawings which show preferred embodiments. The invention is not limited in any way by the purely schematic drawings, wherein it should be mentioned that the drawings are not to scale and are not suitable for defining size ratios. Shown in.

DETAILED DESCRIPTION OF THE INVENTION

Figure 1:
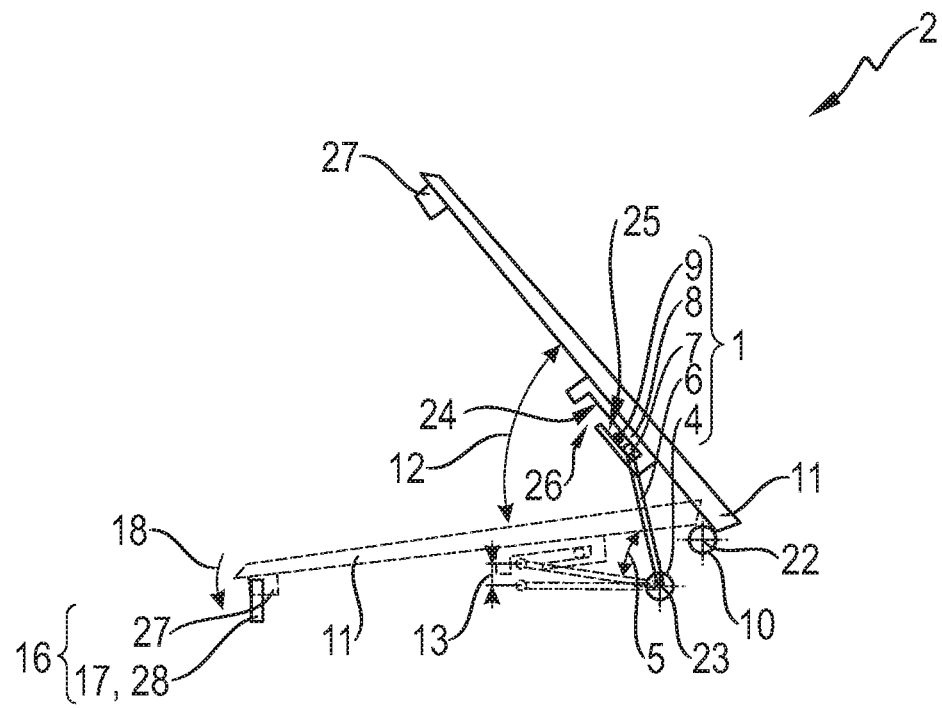
FIG. 1: is an engine hood system with an engine hood drive in a closed position and an open position.
Figure 4:
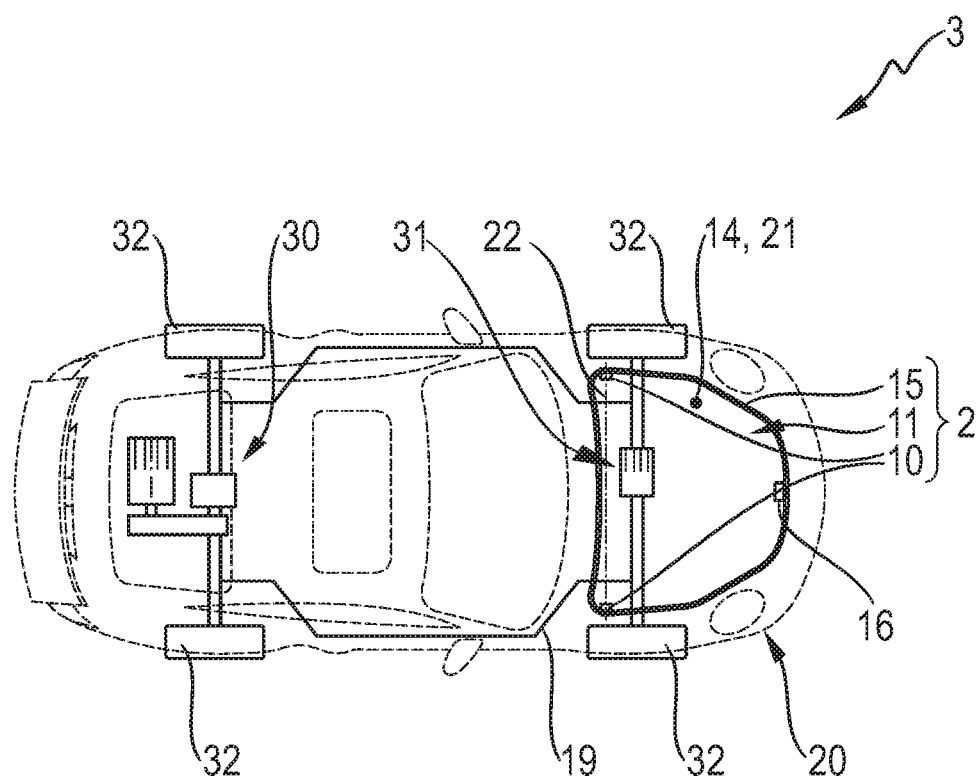
FIG. 4: is a motor vehicle with the engine hood system.

In FIG. 1 an engine hood system 2 with an engine hood drive 1 is shown in a closed position and an open position in a schematic side view. The engine hood system 2 is, for example, a component of a chassis 20 of a motor vehicle 3 as shown in FIG. 4. The engine hood system 2 comprises an engine hood 11, wherein the engine hood 11 is pivotable by means of an engine hood drive 1 between an open position (shown in the drawing in solid lines) and a closed position (shown in the drawing in dashed lines) about a flap hinge 10 with an associated pivot axis 22 at a predetermined flap angle 12. The engine hood drive 1 comprises a drive unit 4, a drive lever 6 and a driving slot 8 and is arranged, as shown in the drawing, below the engine hood 11. The drive unit 4, not shown here in more detail, drives the drive lever 6 and pivots the drive lever 6 between a passive position and an active position about a rigid drive pivot axis 23 at a predetermined adjusting angle 5. Moreover, the drive lever 6 has an actuating end 7, wherein the actuating end 7 in the active position is in force-transmitting contact with the driving slot 8. The driving slot 8, as shown below in the drawing, is fixedly secured to the engine hood 11 and has a guide receiver 9 for the actuating end 7 of the drive lever 6. The guide receiver 9 has in turn an engine hood-side contact path 24 and a drive lever-side coupling path 25, such that the actuating end 7 is guided between the contact path 24 and the coupling path 25. The actuating end 7 of the drive lever 6 is able to be separated from contact with the contact path 24 of the driving slot 8 by means of a drive lever-side opening 26 in the guide receiver 9. Moreover, a lock 16 for securing the engine hood 11 in the closed position is provided on the engine hood 11, in this case at the tip of the engine hood 11. In the embodiment shown, the lock 16 comprises an eye 27 and a closing aid 17. The eye 27 is fixedly secured to the tip of the engine hood 11. The closing aid 17 is movable between a released position and a closed position and also comprises a bolt 28 which is connected in a force-transmitting manner to a receiving frame 15 of a chassis 20 (see FIG. 4) and in the closed position is connected to the eye 27 of the engine hood 11 in a force-transmitting manner.

Figure 2:
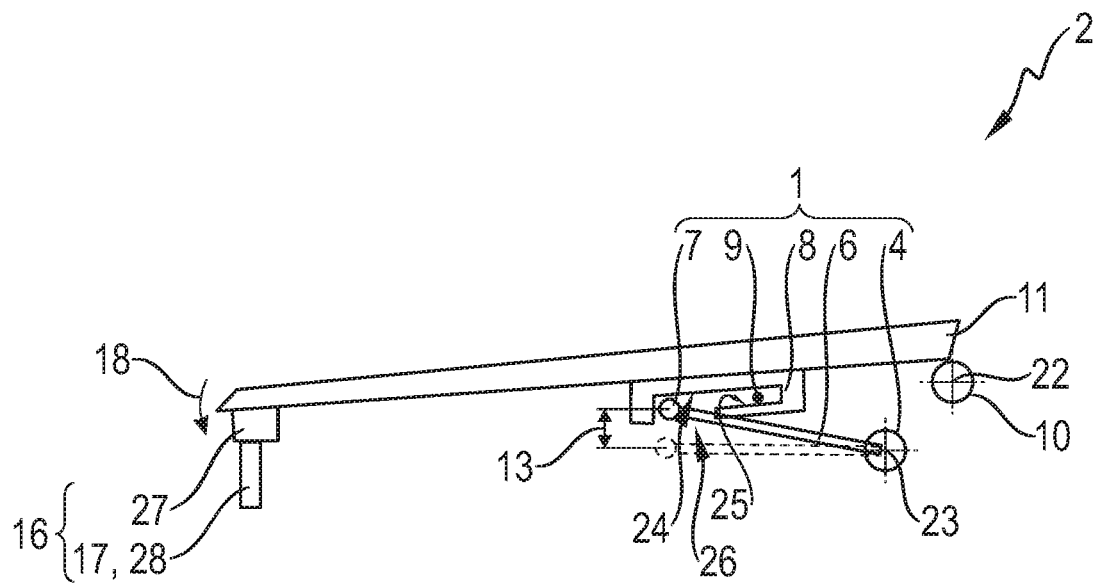
FIG. 2: is the engine hood system according to FIG. 1 with the closing aid in the released position.

In the closed position of the engine hood 11 the closing aid 17 of the lock 16 is in the locked position (bolt 28 and eye 27 fixedly connected) and the drive lever 6 is in the passive position so that the drive lever 6 is entirely separated from the driving slot 8. If the engine hood system 2 is now moved into the open position the lock 16 is unlocked and the closing aid 17 is transferred into the released position and thus the engine hood 11 opened to a minimal extent, as shown in FIG. 2. Then the drive lever 6 is pivoted out of its passive position into the active position at the predetermined adjusting angle 5 (shown in the drawing clockwise), wherein the adjusting angle 5 comprises a free travel 13. The free travel 13 is thus directly adjacent to the passive position in the direction of the active position. After overcoming the free travel 13, the actuating end 7 of the drive lever 6 is now brought into force-transmitting contact with the contact path 24 via the opening 26 of the guide receiver 9, so that with the continued pivoting of the drive lever 6 (clockwise), the driving slot 8 and thus also the engine hood 11 is forced into the open position. Optionally the driving slot 8 and/or the engine hood 11 is able to be held solely by the drive lever 6 and/or the drive unit 4 in the open position counter to a closing moment 18 which is designed to be at a maximum and which is applied to the point (of the tip) of the engine hood 11 spaced furthest apart from the pivot axis 22 of the engine hood 11.

In FIG. 2 the engine hood system 2 according to FIG. 1 is shown with the closing aid 17 in the released position. It may be seen clearly here relative to FIG. 1 that in the released position the engine hood 11 is lifted by one or more centimeters such that when the closing aid 17 is in the released position an injury-causing jamming of a human hand is excluded. In this state of the engine hood 11, the bolt 28 and the eye 27 are simply positioned one on top of the other, as the illustration shows schematically. The drive lever 6 with its actuating end 7 is shown here once again in the passive position (dashed lines) and active position (solid lines), wherein the drive lever 6 (shown in the drawing in solid lines) has already overcome the free travel 13 and has entered the opening 26 of the driving slot 8.

Figure 3:
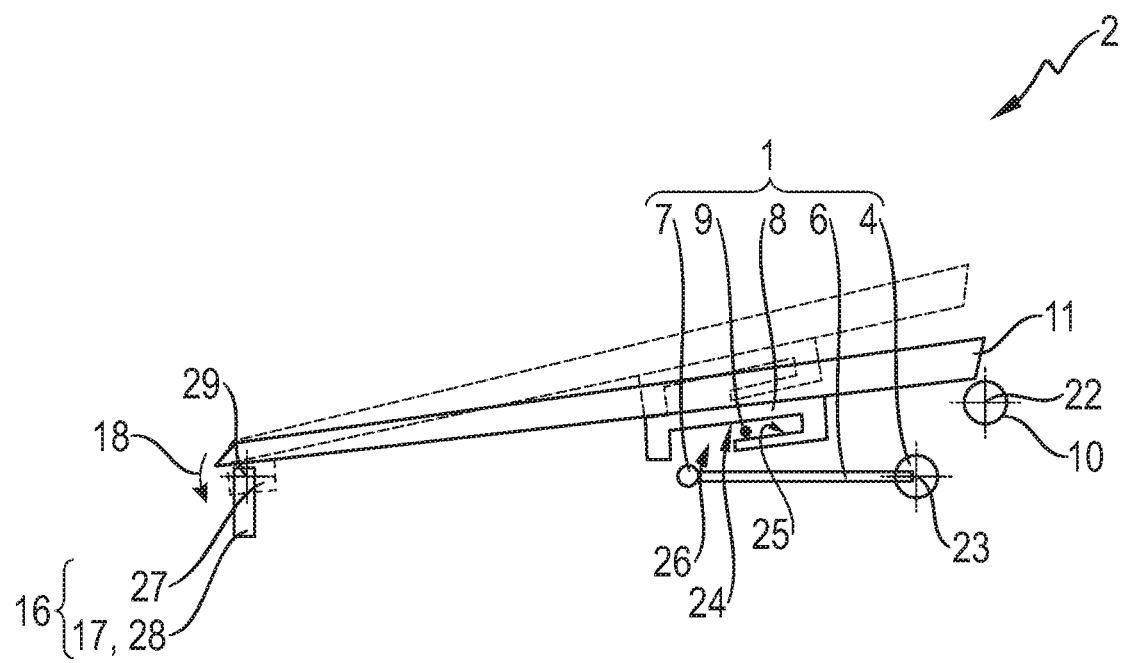
FIG. 3: is the engine hood system according to FIG. 1 in a negative pivoting movement of the engine hood.

In FIG. 3 the engine hood system 2 according to FIG. 1 is shown in the case of the negative pivoting movement of the engine hood 11 (shown in the drawing in dashed lines). In the embodiment shown, therefore, the engine hood 11 and/or the flap hinge 10 is designed for the active impact protection of pedestrians. To this end, the engine hood 11 pivots counterclockwise, as shown in the drawing, about the negative pivot axis 29 (in this case optionally) arranged in the lock 16, such that the engine hood 11 is set higher (on the rear side relative to a motor vehicle 3) than on the front side. To this end the lock 16 and/or the closing aid 17 is located in the locked position. As the drive lever 6 is separated by way of the driving slot 8 in the closed position, in the case of an impact on the engine hood 11 the negative pivoting movement out of the closed position may be carried out immediately.

In FIG. 4 a motor vehicle 3 with the engine hood system 2, for example according to FIG. 1 to FIG. 3, is shown in a schematic plan view. The motor vehicle 3 comprises a chassis frame 19 and a chassis 20 connected thereto. A rear axle drive 30 and a front axle drive 31 (which is smaller, optionally coaxial in this case) with in each case two wheels 32 located on a common wheel axle for the propulsion of the motor vehicle 3 is arranged on the chassis frame 19. A front compartment 14 is formed between (i.e. perpendicular to the image plane) the chassis frame 19 and the chassis 20 in the front region (to the right in the drawing) of the motor vehicle 3, said front compartment being closable in an accessible manner by means of an engine hood 11 and in this embodiment being able to be used as a luggage compartment 21. A receiving frame 15 which is fixedly connected to the chassis 20 is also provided. The engine hood 11 is held on the receiving frame 15 in the closed position by means of the lock 16 which is secured to the receiving frame 15. The engine hood 11 is part of the engine hood system 2 according to an embodiment of FIG. 1 to FIG. 3 and thus may be pivoted between the open position and the closed position.

An engine hood system which has an automatic opening aid and which at the same time is suitable for an emergency opening and/or an active hinge system is provided by means of the engine hood drive proposed herein.

LIST OF REFERENCE NUMERALS

1 Engine hood drive
2 Engine hood system
3 Motor vehicle
4 Drive unit
5 Adjusting angle
6 Drive lever
7 Actuating end
8 Driving slot
9 Guide receiver
10 Flap hinge
11 Engine hood
12 Flap angle
13 Free travel
14 Front compartment
15 Receiving frame
16 Lock
17 Closing aid
18 Closing moment
19 Chassis frame
20 Chassis
21 Luggage compartment
22 Pivot axis
23 Drive pivot axis
24 Contact path of guide receiver
25 Coupling path of guide receiver
26 Opening of guide receiver
27 Eye
28 Bolt
29 Negative pivot axis
30 Rear axle drive
31 Front axle drive
32 Wheel

What is claimed is:

1. An engine hood drive for an engine hood system of a motor vehicle, said engine hood drive comprising:
   a drive unit for delivering a torque at a predetermined adjusting angle between a passive position and an active position;
   a drive lever having an actuating end, wherein the drive lever is connected in a torque-transmitting manner to the drive unit for pivoting between the passive position and the active position, and which;
   a driving slot with a guide receiver for accommodating the actuating end of the drive lever, wherein the driving slot is pivotable about a flap hinge for an engine hood at a predetermined flap angle between a closed position and an open position,
   wherein the driving slot is moveable in a direction of the open position as a result of a pivoting movement of the drive lever from the passive position toward the active position,
   wherein, in the closed position, the driving slot is decoupled from the drive lever.

2. The engine hood drive as claimed in claim 1, wherein as a result of a movement of the driving slot into the open position by the drive lever, the driving slot and the drive lever are fixedly coupled together.

3. The engine hood drive as claimed in claim 1, wherein on a closed position side, on the other side of a predetermined balanced position of the driving slot and before the closed position, the driving slot is decoupled from the drive lever.

4. The engine hood drive as claimed in claim 1, wherein toward the passive position and on the other side of the closed position of the driving slot, the predetermined adjusting angle of the drive lever comprises a free travel.

5. An engine hood system for a motor vehicle comprising:
   an engine hood for a front compartment of a motor vehicle;
   a flap hinge to which the engine hood is connected so as to be pivotable between the closed position and the open position at the predetermined flap angle; and
   the engine hood drive as claimed in claim 4,
   wherein the driving slot is connected in a force-transmitting manner to the engine hood,
   wherein the engine hood is configured to be pivoted by the drive unit between the closed position and the open position.

6. The engine hood system as claimed in claim 5, further comprising:
   a receiving frame, wherein the engine hood in the closed position bears against the receiving frame so as to close the front compartment,
   a lock disposed between the receiving frame and the engine hood for securing the engine hood in the closed position, wherein the lock comprises a closing aid which is movable between a closing aid released position and a closing aid closed position, wherein the closing aid is in contact with the engine hood with the transition into the free travel of the drive lever to such an extent with the engine hood that the engine hood is held open by the closing aid in the closing aid released position.

7. The engine hood system as claimed in claim 5, wherein, with the engine hood in the closed position, the engine hood is configured for a negative pivoting movement by way of the flap hinge.

8. The engine hood system as claimed in claim 5, wherein the engine hood is configured to be held in the open position by the drive lever in cooperation with the driving slot, and wherein a corresponding closing moment, which is configured to be at a maximum, is able to be received by the drive unit.

9. A motor vehicle comprising a chassis frame, a front compartment, the engine hood system as claimed in claim 5 and a chassis, wherein the chassis comprises the engine hood of the engine hood system, and wherein the front compartment is a luggage compartment.

10. A motor vehicle comprising the engine hood drive of claim 1.

* * * * *